United States Patent
Prados et al.

(10) Patent No.: US 7,920,126 B2
(45) Date of Patent: *Apr. 5, 2011

(54) INPUT DEVICE

(75) Inventors: Michael Prados, Redwood City, CA (US); Philippe Alessandrini, Palo Alto, CA (US); Wolfgang Bloehs, Ingolstadt (DE)

(73) Assignee: Volkswagen AG, Wolfsburg (DE)

( * ) Notice: Subject to any disclaimer, the term of this patent is extended or adjusted under 35 U.S.C. 154(b) by 884 days.

This patent is subject to a terminal disclaimer.

(21) Appl. No.: 11/322,056

(22) Filed: Dec. 29, 2005

(65) Prior Publication Data

US 2006/0146037 A1    Jul. 6, 2006

Related U.S. Application Data

(60) Provisional application No. 60/640,677, filed on Dec. 30, 2004.

(51) Int. Cl.
    G06F 3/041    (2006.01)
(52) U.S. Cl. .................... 345/173; 345/156; 345/176
(58) Field of Classification Search .................. 345/156, 345/173–176, 771, 701; 178/18.01–18.06; 701/1, 48, 71
    See application file for complete search history.

(56) References Cited

U.S. PATENT DOCUMENTS

| | | | |
|---|---|---|---|
| 4,764,871 A * | 8/1988 | van Zanten ............... 701/71 |
| 4,914,624 A | 4/1990 | Dunthorn .................. 364/900 |
| 5,943,043 A | 8/1999 | Furuhata et al. .......... 345/173 |
| 6,118,435 A | 9/2000 | Fujita et al. .............. 345/173 |
| 6,411,877 B2 * | 6/2002 | Bockmann et al. ........ 701/48 |
| 6,429,846 B2 | 8/2002 | Rosenberg et al. ........ 345/156 |
| 6,492,979 B1 | 12/2002 | Kent et al. ............... 345/173 |
| 6,577,928 B2 * | 6/2003 | Obradovich ............... 701/1 |
| 6,636,202 B2 * | 10/2003 | Ishmael et al. ............ 345/173 |
| 6,822,635 B2 * | 11/2004 | Shahoian et al. ......... 345/156 |
| 6,856,259 B1 | 2/2005 | Sharp .................. 341/5 |
| 6,958,749 B1 | 10/2005 | Matsushita et al. ....... 345/175 |
| 7,113,177 B2 * | 9/2006 | Franzen ................... 345/173 |
| 7,158,123 B2 | 1/2007 | Myers et al. ............. 345/173 |
| 7,499,040 B2 * | 3/2009 | Zadesky et al. .......... 345/204 |
| 2001/0043189 A1 | 11/2001 | Brisebois et al. ......... 345/156 |
| 2002/0033795 A1 | 3/2002 | Shahoian et al. ......... 345/156 |
| 2002/0149561 A1 * | 10/2002 | Fukumoto et al. ........ 345/156 |
| 2002/0149571 A1 | 10/2002 | Roberts .................. 345/174 |
| 2002/0180710 A1 * | 12/2002 | Roberts .................. 345/173 |
| 2003/0006892 A1 * | 1/2003 | Church ................... 340/439 |
| 2003/0048251 A1 * | 3/2003 | Liang et al. ............. 345/156 |
| 2003/0058265 A1 * | 3/2003 | Robinson et al. ......... 345/701 |
| 2003/0076306 A1 * | 4/2003 | Zadesky et al. .......... 345/173 |
| 2003/0095112 A1 | 5/2003 | Kawano et al. .......... 345/173 |
| 2003/0122779 A1 | 7/2003 | Martin et al. ............ 345/156 |
| 2003/0184526 A1 * | 10/2003 | Nakajima et al. ......... 345/173 |

(Continued)

FOREIGN PATENT DOCUMENTS

DE    19731285    1/1999

(Continued)

Primary Examiner — Amare Mengistu
Assistant Examiner — Premal Patel
(74) Attorney, Agent, or Firm — King & Spalding L.L.P.

(57) ABSTRACT

An input device, especially for a vehicle, comprises a touchscreen to enter commands by touching an operating surface of the touchscreen or by pressing on the operating surface, an actuator to move the touchscreen in at least one direction, and a control module to control the actuator as a function of the speed of a touching movement over the operating surface.

18 Claims, 6 Drawing Sheets

U.S. PATENT DOCUMENTS

| | | | |
|---|---|---|---|
| 2004/0046751 A1 | 3/2004 | Heimermann et al. | 345/184 |
| 2004/0141007 A1* | 7/2004 | Amari et al. | 345/771 |
| 2004/0164971 A1* | 8/2004 | Hayward et al. | 345/179 |
| 2004/0188151 A1* | 9/2004 | Gerpheide et al. | 178/18.01 |
| 2005/0024344 A1 | 2/2005 | Trachte | 345/173 |
| 2006/0022955 A1 | 2/2006 | Kennedy | 345/173 |
| 2006/0028428 A1 | 2/2006 | Dai et al. | 345/156 |
| 2006/0097991 A1 | 5/2006 | Hotelling et al. | 345/173 |
| 2006/0209037 A1* | 9/2006 | Wang et al. | 345/173 |

FOREIGN PATENT DOCUMENTS

| | | |
|---|---|---|
| DE | 20180024 | 1/2001 |
| DE | 10139693 | 5/2002 |
| DE | 20102197 | 5/2002 |
| EP | 0773496 | 5/1997 |
| EP | 0836362 | 4/1998 |
| JP | 2001134382 | 5/2001 |
| WO | 99/66763 | 12/1999 |
| WO | 00/21795 | 4/2000 |
| WO | 01/33103 | 5/2001 |
| WO | 01/54109 | 7/2001 |
| WO | 03032141 | 4/2003 |
| WO | 03/038800 | 5/2003 |
| WO | 03/041046 | 5/2003 |
| WO | 03038800 | 5/2003 |

* cited by examiner

INPUT DEVICE

CROSS-REFERENCE TO RELATED APPLICATIONS

This application claims the benefit of U.S. Provisional Application No. 60/640,677 filed on Dec. 30, 2004, entitled "EINGABEVORRICHTUNG", which is incorporated herein by reference in its entirety.

TECHNICAL FIELD

The invention concerns an input device with a touchscreen, especially an input device for a vehicle.

BACKGROUND

A touchscreen is known from DE 201 02 197 U1 (incorporated by reference). A touchscreen for display of electronic signals and an a confirming touch input of characters and symbols, consisting of a function level for display and key entry and a higher-order, point-deformable protective level corresponding to it, is disclosed in DE 201 02 197 U1. During selection of certain points of the functional level, by means of touch, at least one operating signal for the touch direction (haptic stimulus) of the user is detectable via the protected level at the position of the contact point in the deformed protected level and the operating signal for the touch direction (haptic stimulus) is generated by oscillation elements arranged eccentrically inside and/or beneath the function level. In addition, in the touchscreen known from DE 201 02 197 U1, transmission of the generated oscillations from the function to the protection level occurs by direct contact of the two levels and/or via the edge regions of the levels by rigid or elastic connection elements.

Details concerning touchscreens can be taken, for example, from the Internet page www.3m.com/3mtouchsystems/. The following touchscreens of 3M™ are offered:

MicroTouch™ 12.1" FPD Touch Monitor (vg. www.3m.com/3mtouchsystems/Products/Monitors/FPDdesktop.jhtlm)

MicroTouch™ M150 FPD Touch Monitor (vg. www.3m.com/3mtouchsystems/Products/Monitors/M150.jhtlm)

MicroTouch™ CRT Touch Monitor (vg. www.3m.com/3mtouchsystems/Products/Monitors/CRTdesktop.jhtlm)

MicroTouch™ ChassisTouch™ FPD Touch Monitor (vg. www.3m.com/3mtouchsystems/Products/Monitors/FPDchassis.jhtlm)

MicroTouch™ ChassisTouch™ CRT Touch Monitor (vg. www.3m.com/3mtouchsystems/Products/Monitors/CRTchassis.jhtlm)

Additional details concerning touchscreens can also be taken from the following Internet pages:

www.elotouch.com/products/default.asp
www.3m.com/3mtouchsystems/Products/Resistive/5-wire.jhtml
www.3m.com/3mtouchsystems/Products/Resistive/PL-.jhtml
www.3m-com/3mtouchsystems/Products/Resistive/FG.jhtml
www.3m.com/3mtouchsystems/Products/Resistive/SRTS.jhtml A touch control with haptic feedback for entry of signals into a computer and output of forces to a user of the touch control for haptic feedback is known from DE 201 80 024 U1 and the corresponding WO 01/54109 A1 (incorporated by reference), in which the touch control has a touch input device, which has a roughly flat contact surface, operated so that it enters a position signal into a processor of the computer, based on a position on the touch surface that the user touches, during which the position signal indicates the position in two dimensions. The touch control according to WO 01/54109 A1 also has at least one actuator connected to the touch input device, in which the actuator delivers a force to the touch input device, in order to provide a haptic sensation for the user touching the touch surface, in which the actuator delivers the force based on force information sent by the processor directly to the touch input device.

Haptic feedback is also known from U.S. Pat. No. 6,429,846, WO 03/038800 A (incorporated by reference) and WO 03/41046 A1 (incorporated by reference).

An operating element for a device with several selectable menus, functions and/or function values is known from DE 197 31 285 A1, having a surface that can be grasped by the user, and via which selection can be carried out by local movement or contact of the surface. The surface can be varied in its configuration according to the selected and/or selectable menus, function and/or function value.

SUMMARY

The task of the invention is to improve an input device with a touchscreen. It is desirable to devise an input device that is particularly suited for vehicles.

The aforementioned task is solved by an input device, especially for a vehicle, for a touchscreen for input of commands by touching an operating surface of the touchscreen or by pressing on the operating surface, with an actuator to move the touchscreen in at least one direction, and with a control module to control the actuator as a function of a speed of a touching movement over the operating surface and/or a quantity derived from this speed.

A touching movement over the operating surface is understood to mean that the operating surface is touched, for example, with a finger, but this finger is simultaneously moved over the operating surface.

A quantity derived from the speed according to the invention can be a quantity formed from a measured speed. A quantity derived from the speed according to the invention, however, can also be a quantity, during whose formation a speed is used. For example, in this sense, a quantity derived from the speed can be a path, determined by means of an observer, which includes a speed as a variable of state.

In one configuration of the invention, the input device also includes a speed calculator to determine the speed of the touching movement over the operating surface and/or the quantity derived from this speed, especially to determine the speed of the touching movement over the operating surface and/or the quantity derived from this speed as a function of a measured position of the touching movement over the operating surface. It can therefore be prescribed that the speed of the touching movement over the operating surface and/or the quantity derived from this speed be determinable as a function of a position of touching of the operating surface.

In another embodiment of the invention, the speed calculator includes an observer, especially a Kalman filter.

In another embodiment of the invention, the actuator can be driven by means of the control module, also as a function of the position of touching of the operating surface or the position of a pressing on the operating surface.

In another embodiment of the invention, the touchscreen can be moved periodically by the actuator with a frequency and/or amplitude adjustable by the control module.

In another embodiment of the invention, the frequency and/or amplitude can be adjusted as a function of the speed of the touching movement over the operating surface and/or the quantity derived from this speed.

In another embodiment of the invention, the touchscreen can be moved, by means of the actuator, essentially parallel to the operating surface.

In another embodiment of the invention, a rotational movement can be generated by means of the actuator, in which the access of the rotational movement can be essentially perpendicular to the operating surface.

In another embodiment of the invention, the input device also includes at least one essentially U-shaped spring for mechanical connection of the touchscreen to a reference element. Such a reference element can be a part of a vehicle, for example, a steering wheel or a console. It can be prescribed that the touchscreen is also designed for optical display of information. In an alternative embodiment, however, a display for optical display of information is arranged beneath the (transparent) touchscreen, in which the touchscreen can be moved relative to the display, especially in a direction essentially parallel to the operating surface. In this case, the display is the reference element according to the invention, or at least part of the reference element according to the invention.

In one embodiment of the invention, the input device includes at least three, especially four, essentially U-shaped springs for mechanical connection of the touchscreen to the reference element.

In another embodiment of the invention, the essentially U-shaped spring has an especially 5 mm to 30 mm wide opening, directed essentially toward the touchscreen. In addition, the essentially U-shaped spring, in one embodiment of the invention, has an opening at the essentially opposite crest, in which the essentially U-shaped spring is aligned, so that an imaginary line passing through the crest and through the opening runs essentially parallel to the operating surface.

In one embodiment of the invention, the actuator is configured, so that the touchscreen can be moved, by means of the actuator, essentially parallel to the operating surface, especially because of a rotational movement of the actuator.

In another embodiment of the invention, the essentially U-shaped spring has a thickness from 0.5 mm to 2 mm. The spring, in another embodiment according to the invention, consists essentially of plastic. Such a plastic can be polycarbonate, ABS, acetal or polyethylene. Essentially U-shaped springs made of acetal are particularly suitable.

In another embodiment of the invention, the essentially U-shaped spring has a spring constant adjusted to a weight of the touch screen, so that the touchscreen, in conjunction with the essentially U-shaped spring (or all springs) has a natural mechanical frequency from 5 Hz to 150 Hz, especially a natural frequency of 30 Hz to 75 Hz.

In another embodiment of the invention, the essentially U-shaped spring has two spring arms, an opening arranged between the two spring arms and a connection point, at which the two spring arms are connected, in which the essentially U-shaped spring has a main spring constant parallel to the opening and a secondary spring constant in a direction running through the connection point and through the opening, and in which the secondary spring constant is at least twice the main spring constant, especially at least three times that value. In another embodiment of the invention, the essentially U-shaped spring has two spring arms, an opening arranged between the two spring arms and a connection point, at which the two spring arms are connected, in which the essentially U-shaped spring has a main spring constant parallel to the opening, in which the essentially U-shaped spring has a secondary spring constant perpendicular to the opening, and in which the secondary spring constant is at least twice the main spring constant. Springs in which the secondary spring constant amounts to at least four times the main spring constant are suitable.

In another embodiment of the invention, the essentially U-shaped spring has two spring arms, an opening arranged between the two spring arms and a connection point, at which the two spring arms are connected, in which the essentially U-shaped spring has a main spring constant parallel to the opening and operating surface, in which the essentially U-shaped spring has a secondary spring constant perpendicular to the opening, but parallel to the operating surface, and in which the secondary spring constant is at least two times, especially three times, the main spring constant. Springs in which the secondary spring constant is at least four times the main spring constant are readily suitable.

In another embodiment of the invention, the input device includes at least two essentially U-shaped springs and at least one mechanical connection element for connection of the at least two essentially U-shaped springs, in which the mechanical connection element and the at least two essentially U-shaped springs are produced, or especially cast, together from one piece. In another embodiment of the invention, the input device comprises at least three essentially U-shaped springs and at least a frame to connect the at least three essentially U-shaped springs and to accommodate the touchscreen, in which the frame and the at least three essentially U-shaped springs are produced, or especially cast, together from one piece. In another embodiment of the invention, the input device comprises at least four essentially U-shaped springs and at least one frame to connect the at least four essentially U-shaped springs and to accommodate the touchscreen, in which the frame and the at least four essentially U-shaped springs are produced, especially cast, together from one piece.

In another embodiment of the invention, the touchscreen is held freely floating relative to the reference element by the essentially U-shaped springs, especially without a ball bearing and a ball bearing-like element and/or a sliding surface.

In another embodiment of the invention, the actuator can be driven, so that when the operating surface is touched at a first position, a supposedly surface condition of the operating surface can be felt, which can be distinguished from the actual surface condition of the operating surface, and/or that when the operating surface is touched at a first position, a supposedly surface condition of the operating surface can be felt that can be distinguished from a supposedly surface condition of the operating surface at least one second position.

The aforementioned task, especially in conjunction with the aforementioned embodiments, is also solved by an input device with a touchscreen for input of commands by touching an operating surface of the touchscreen or by pressing on the operating surface, with an actuator for movement of the touchscreen in at least one direction and with a control module for control of the actuator, so that when the operating surface is touched at one position, a supposedly surface condition of the operating surface can be felt that can be distinguished from the actual surface condition of the operating surface, and/or that when the operating surface is touched in a first position, a supposedly surface condition of the operating surface can be felt that can be distinguished from a supposedly surface condition of the operating surface at least one second position.

The aforementioned task is also solved, especially in conjunction with the aforementioned embodiments, by an input device with a touchscreen for input of commands by touching an operating surface of the touchscreen or by pressing on the operating surface, an actuator for movement of the touchscreen in at least one direction and an observer to determine a speed of a touching movement over the operating surface or a quantity derived from this speed.

In one embodiment of the invention, the observer is configured as a Kalman filter.

Additional advantages and details are apparent from the following description of practical examples.

DETAILED DESCRIPTION

Figure 1:
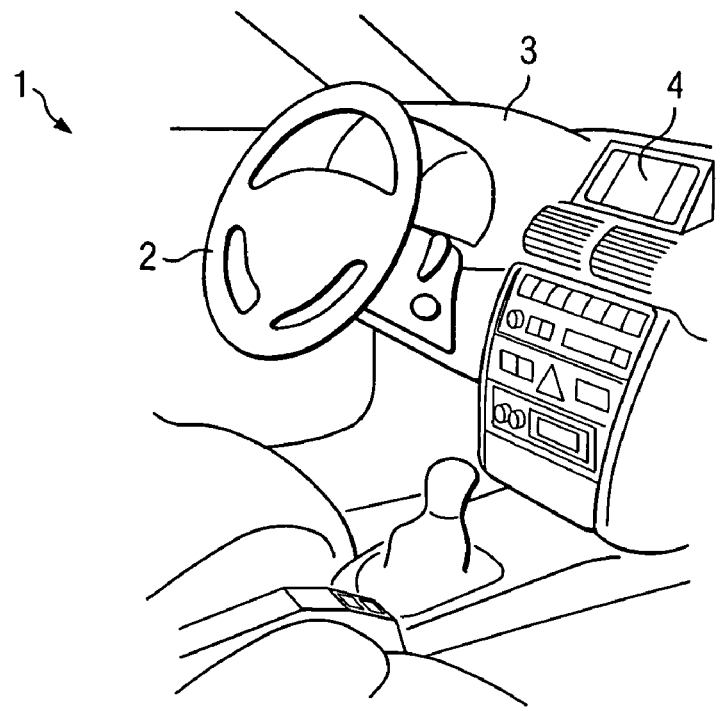
FIG. 1 shows a practical example for a cockpit of a vehicle.
Figure 2:
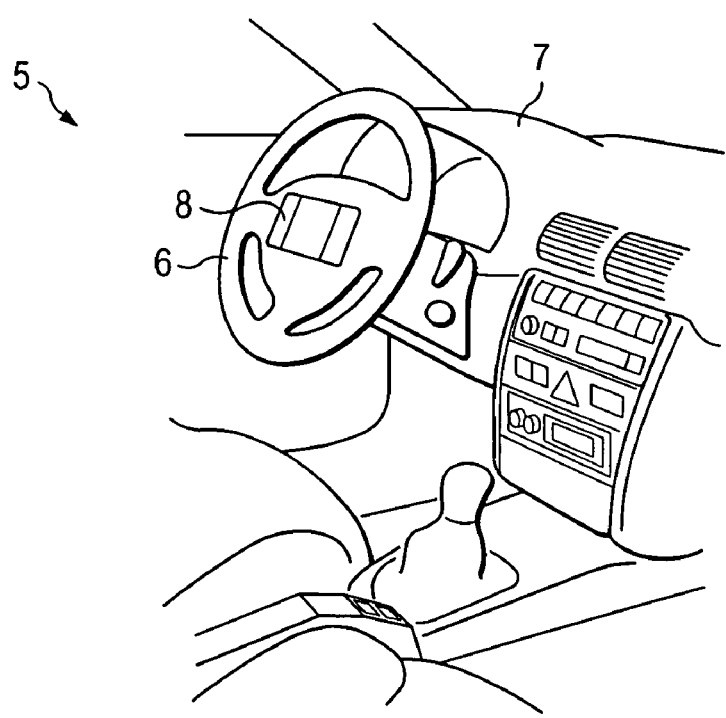
FIG. 2 shows another practical example for a cockpit of a vehicle.

FIG. 1 shows a practical example for a cockpit 1 of a vehicle. In the cockpit 1, a steering wheel 2 is arranged beneath a dashboard 3. The dashboard 3 has an input device 4 arranged next to steering wheel 2. FIG. 2 shows an alternative practical example for a cockpit of a vehicle, in which a steering wheel 6 is also arranged beneath its dashboard 7 in cockpit 5. However, deviating from the practical example according to FIG. 1, an input device 8 is arranged in the steering wheel 6.

Figure 3:
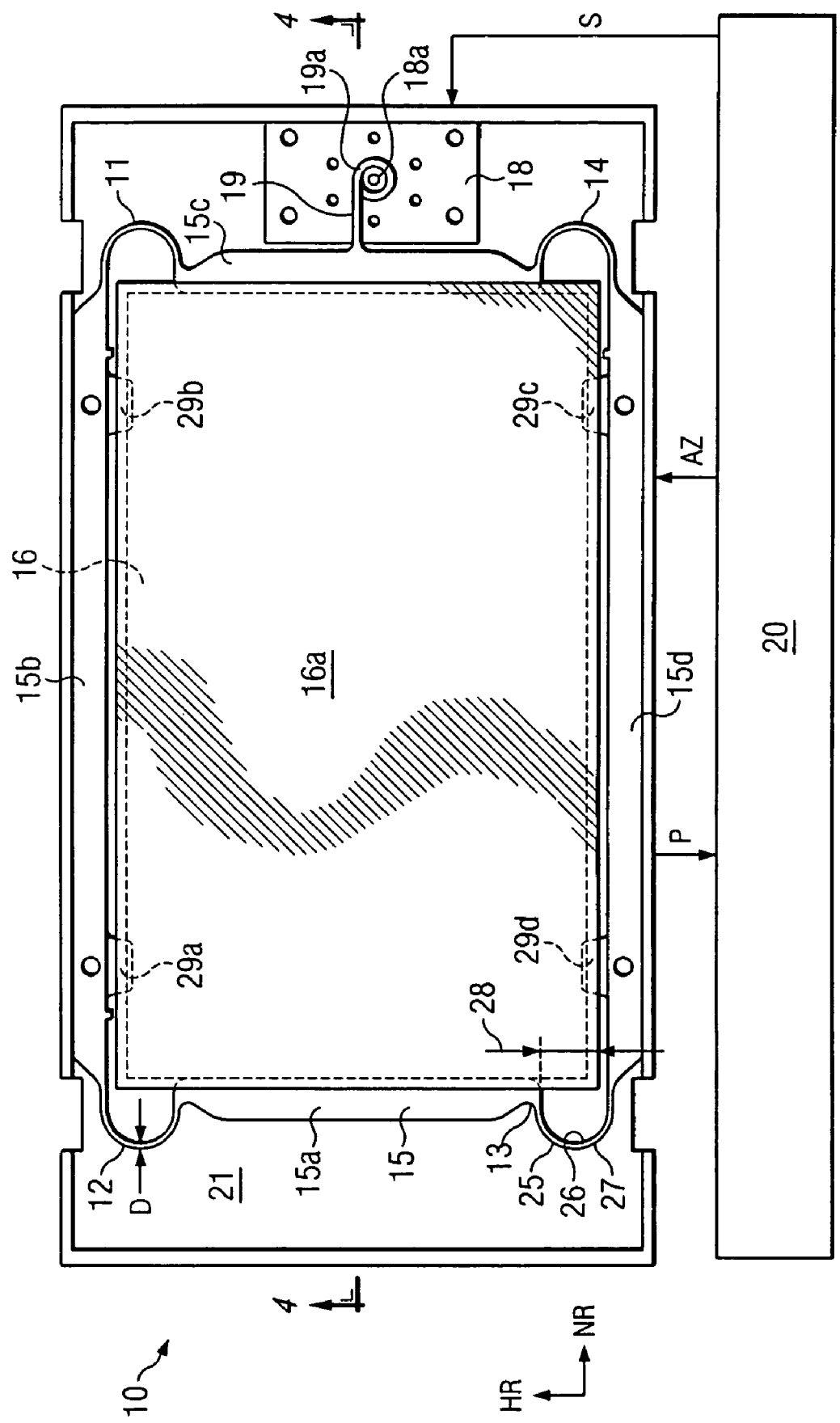
FIG. 3 shows an input device.
Figure 4:
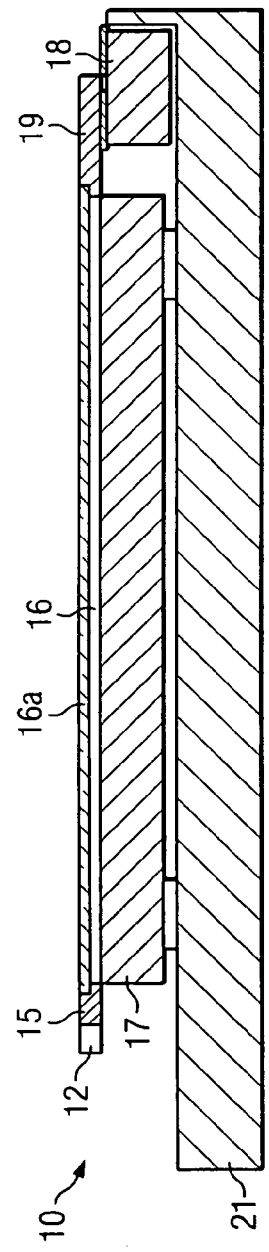
FIG. 4 shows a cross section of the input device along line A-A according to FIG. 3.

FIG. 3 shows, as a possible practical example of an input device 4 or 8, an input device 10 for optical display of information and for entry of commands in a top view. FIG. 4 shows a cross section of the input device 10 along line B-B according to FIG. 3. The input device 10 has a transparent touchscreen 16 with an operating surface 16A arranged over display 17. Display 17 is connected to reference element 21 by means of mounts 29A, 29B, 29C and 29D. The reference element 21 can be part of the dashboard 3 or steering wheel 6.

The touchscreen 16, in an advantageous embodiment, can include a force sensor (not shown) or an equivalent sensor, by means of which a pressure exerted by an operator on touchscreen 16 can be determined. In this manner, by means of touchscreen 16, touching of touchscreen 16 by a user can be distinguished from a known operation by pressing on the touchscreen 16. In this case, touching of touchscreen 16 on a site indicated as operating element therefore leads to operation of the touchscreen 16, but not simple touching of the touchscreen 16 by a user on a site indicated as an operating element. This type of configuration is advantageous for use in vehicles.

Touchscreen 16 is secured by means of a frame 15. Frame 15 has four U-shaped springs 11, 12, 13, 14, which are connected to each other by connecting elements 15A, 15B, 15C and 15D. The frame 15 is a plastic cast part, i.e., the U-shaped springs 11, 12, 13, 14 are cast together from one piece of plastic with the connection elements 15A, 15B, 15C and 15D. Such a plastic can be polycarbonate, ABS, acetal or polyethylene. Particularly suitable U-shaped springs can be made from acetal.

The frame is glued on the connection elements 15A and 15C to the touchscreen 16. As an alternative or in an additional embodiment, the touchscreen 16 is secure din the frame by a bias in U-shaped springs 11, 12, 13, 14.

The frame 15 has a (flexible) connection piece 19, connected to the connection element 15C. Connection piece 19 has a distortion 19A, comprising an eccentric drive shaft pin 18A of an actuator designed as an electric motor. The rotational movement of actuator 18 is converted to a translational movement. Actuator 18 is configured as a DC (brush) motor. However, other configurations can also be used in conjunction with a different connection to frame 15, for example, piezoactuators or so-called voice coils.

The U-shaped springs 11, 12, 13, 14 each have two spring arms 25 and 27, an opening 28 arranged between the two spring arms 25 and 27 and a connection point 26, at which the two spring arms 25 and 27 are connected. The U-shaped springs 11, 12, 13, 14 have a main spring constant, essentially parallel to opening 28, and a secondary spring constant, essentially perpendicular to opening 28, in which the secondary spring constant is at least four times the main spring constant. In the present practical example, the main spring constant refers to a direction designation main direction HR in FIG. 3, and the secondary spring constant pertains to a direction designated secondary direction NR in FIG. 3. The main direction HR and the secondary direction NR are orthogonal to each other, but parallel to operating surface 16A.

The U-shaped springs 11, 12, 13, 14 have a thickness D from 0.5 mm to 2 mm, in the present practical example 0.8 mm. The width of opening 28 is between 5 mm and 30 mm. The specific width of opening 28 is chosen as a function of the material, so that a desired main spring constant is achieved. The main spring constant is then adjusted to a weight of the touchscreen 16, so that the touchscreen 16, in conjunction with U-shaped springs 11, 12, 13, 14, has a mechanical natural frequency from 5 Hz to 150 Hz, especially a natural frequency from 30 Hz to 75 Hz. In the present practical example, it is prescribed that the natural frequency is 55 Hz. Natural frequency according to the invention is especially the smallest mechanical resonance frequency of the system, consisting of U-shaped springs 11, 12, 13, 14 and touchscreen 16.

The term U-shaped springs according to the invention is to be understood as broadly as possible. U-shaped springs according to the invention therefore include springs having two spring arms.

The touchscreen 16 and display 17, according to FIGS. 3 and 4, are connected, in terms of data, to a control 20, from which a signal AZ with information to be displayed on display 17 is sent to display 17. The control 20 receives a signal P from touchscreen 16, stating where a user is touching the touchscreen 16 and/or, if prescribed, whether the user is pressing on a position of touchscreen 16 marked as an input position, so that this is to be understood as an input. It can be prescribed that an input occurs by simple touching of touchscreen 16. However, it could also be prescribed that an input does not occur merely by simple touching of touchscreen 16, but by (light) pressing on touchscreen 16. The latter is a procedure particularly suitable for use in vehicles.

Figure 5:
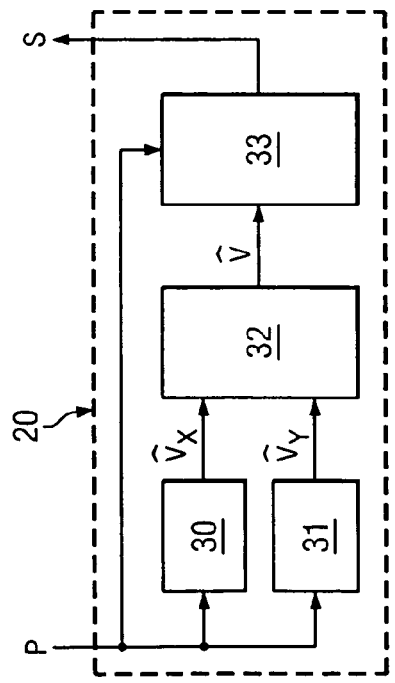
FIG. 5 shows a control.

For certain regions or positions of touch surface 16A, it is prescribed to generate such a control signal S by means of control 20, so that during touching of operating surface 16A at one position, a supposedly surface condition of operating surface 16A can be felt, which can be distinguished from the actual surface condition of operating surface 16A, and/or that when the operating surface 16A is touched at a first position, a supposedly surface condition of operating surface 16A can be felt, which can be distinguished from a supposedly surface condition of operating surface 16A at least the second position. On possible implementation of such a control 20 is shown in FIG. 5. Only the functions or modules that serve to simulate a surface condition are shown there. Further functions or modules of control 20 are not shown, for reasons of clarity.

Figure 6:
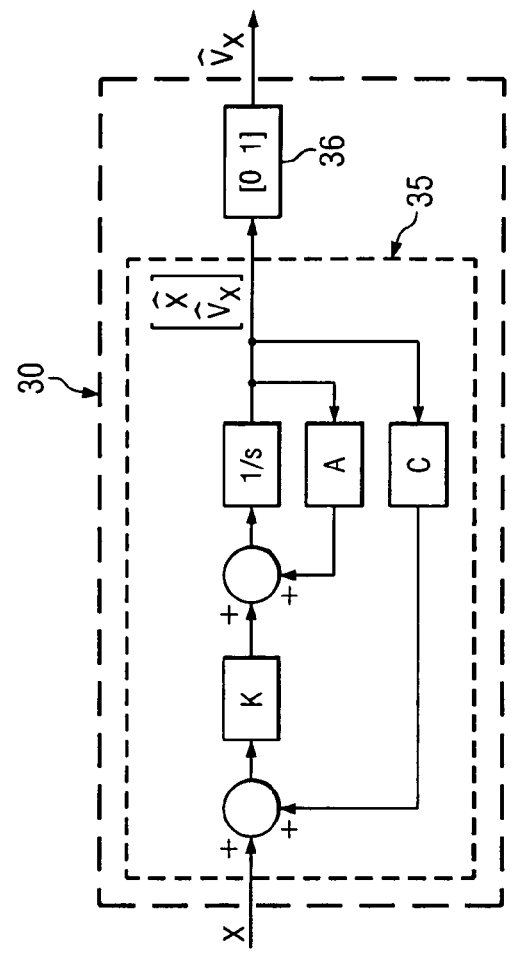
FIG. 6 shows a speed calculator.

The control 20 includes (with reference to FIG. 6, described later) a speed calculator 30 for calculation of a speed $\hat{v}_x$, a touching movement over the operating surface in the x direction and/or a quantity derived from this speed $\hat{v}_x$, like an estimated x component $\hat{x}$ of a position. The input quantity in the speed calculation 30 is the x component x of position P.

The speed calculator 30 includes a Kalman filter 35, in which $$A = \begin{bmatrix} 0 & 0 \\ 0 & -m \cdot \rho \end{bmatrix}$$

and $$C = \begin{bmatrix} 1 & 0 \end{bmatrix}$$

m·ρ is a constant. This constant can be chosen, so that m describes, for example, the weight of a human forearm and ρ a friction valve for characterization of a friction force between the skin and touch surface 16A during slight pressure on touch surface 16A.

K is the so-called Kalman amplification. Details for calculation of Kalman amplification can be gathered from the book "Optimum Systems Control", pages 191 to 261 (incorporated by reference).

The control 20 also includes a speed calculator 31, configured similarly to speed calculator 30, for calculation of a speed $\hat{v}$ of a touching movement over the operating surface in the y direction and/or a quantity derived from this speed $\hat{v}_y$, like an estimated y component $\hat{y}$ of a position. The input quantity in the speed calculation 30 is the y component y of position P.

The control 20 optionally includes a module 32 for calculation of a total speed $\hat{v}$ according to 0

$$\hat{v} = |\sqrt{\hat{v}_x^2 + \hat{v}_y^2}|$$

and a control module 33 to generate the control signal S. It can then be prescribed that the control signal S is formed according to $$S = S_0 \sin(2 \cdot \pi \cdot f \cdot t)$$

with $$f = c1 \cdot \hat{v}$$

or with $$f = c2 \cdot \hat{v} + c3$$

in which $S_0$, c1, c2 and c3 are constants, and in which t is time.

It can also be prescribed that $S_0$ is a function of total speed $\hat{v}$. For example, $S_0$ can be formed according to $$S_0 = c4 \cdot \hat{v} + c5$$

in which c4 and c5 are constants. In this case, it can also be prescribed that c2 equals 0.

In an alternative embodiment, the control signal S is formed according to $$S = S_0 \cdot \sin(c6 \cdot t)$$

in which c6 is a constant that can also include one, and in which $S_0$ can be calculated, for example, by a Fourier series, which is formed in a published article according to the Internet address
www.isrg.reading.ac.uk/common/publications00226.pdf
"MODELING OF SURFACE IDENTIFYING CHARACTERISTICS USED IN FOURIER SERIES", S. A. Wall and W. S. Harwin, The Department of Cybernetics, University of Reading, for describing surface treatment. Thus, it can be prescribed that $S_0$ is formed according to the following equation:

$$S_0 = \sum_{m=6}^{50} \left( \sum_{n=6}^{50} (a_{n,m}\cos(n\omega_0\bar{x}) + b_{n,m}\sin(n\omega_0\bar{x})) + a_{n,m}\cos(n\omega_0\bar{x}) + b_{n,m}\sin(n\omega_0\bar{x}) \right)$$

In the case of such calculation of $S_0$, module 32 drops out. In addition, the velocity of calculator 30 and 31 is to be changed, so that the functional block 36 is the same as matrix C. This means [0 1] can be replaced with [1 0].

It can also be prescribed that the control signal S is configured as a velocity- or path-dependent rectangular signal, as a velocity- or path-dependent triangular signal or as a speed- or path-dependent periodic function with, for example, 1000 support sites for one period.

In addition to simulation of different surfaces, haptic feedback can also be prescribed for confirmation of input of a command. It can then prescribed that control 20 generate an at least 50 ms long control signal S as confirmation of input of a command, by means of which actuator 18 is briefly moved. The individual components of the input device are then dimensioned, so that the touchscreen 16 is deflected less than 1 mm. A control signal S can be a simple jump function for a duration between 50 ms and 800 ms, especially for a duration between 100 ms and 400 ms, or a control signal for generation of a more complex movement.

In a configuration preferred by a number of test subjects, the touchscreen 16 can be moved to confirm a command, entered by means of touchscreen 16, with a diminishing oscillation in a direction parallel to touchscreen 16. The diminishing oscillation has an envelope curve with an exponential fraction. The envelope curve then has a term $t^{a0}$ or a term $b0^t$, in which a0 and b0 are variables. The envelope curve can be a function of $a1+a2 \cdot t^{a3}$ or $b1+b2^t$, in which a1, a2, a3, b1 and b2 are variables. In addition, the diminishing oscillation has a frequency between 5 Hz and 80 Hz. A particularly suitable control signal has a frequency of 38.1 Hz and has decayed after 210 ms, in which decay occurs according to a quadratic relation.

The input devices 4 and 8, configured according to input device 10, can, in an advantageous embodiment, replace, for example, a display and operating device disclosed in WO 00/21795 (incorporated by reference), while retaining its menu-guided functionality. FIG. 7, FIG. 8, FIG. 9, FIG. 10, FIG. 11 and FIG. 12 show different masks that can be displayed by an input device 40. The input device 40 is then configured according to input device 10.

Figure 7:
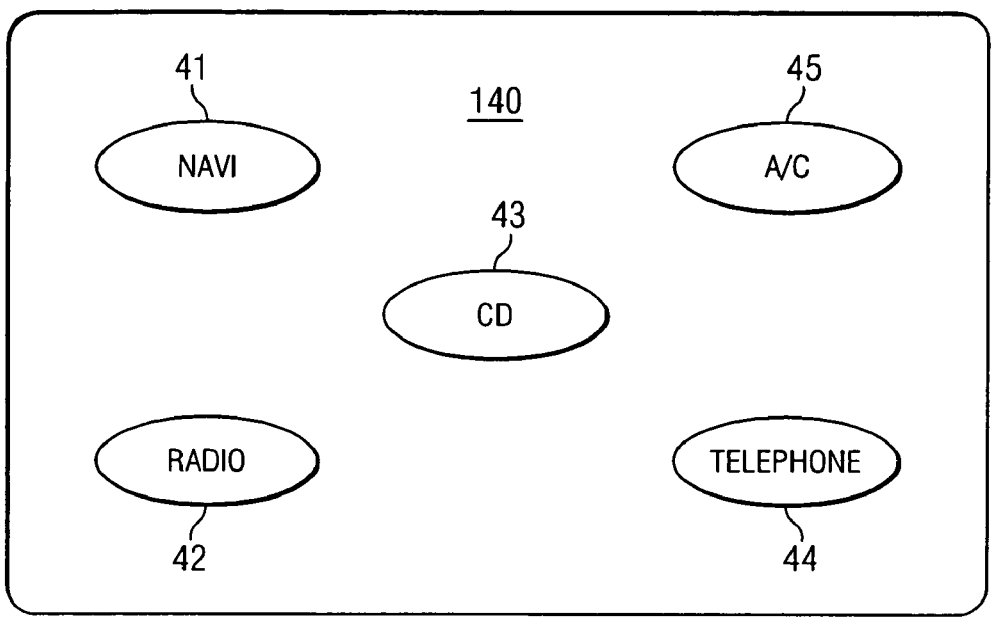
FIG. 7 shows a practical example for a base mask, depicted by means of an input device.

The input device 40 in FIG. 7 is shown with a ground mask. The input device 40 represents five operating elements 41, 42, 43, 44 and 45, executed by ellipsis. By pressing the operating element 42 in FIG. 7, a mask, for operation of a radio, is called up and by pressing operating element 43 in FIG. 7 a mask for operation of a CD player is called up. If the input device 0 is touched on its touch surface in a region 140 above operating element 41, 42, 43, 44 and 45, a control signal S is generated by control 20 to simulate a rough surface of the touch surface. It can be prescribed, during touching of operating elements 41, 42, 43, 44 and 45, that no special surface properties or other surface properties than for region 140 be simulated. In this manner, an operator of the input device 40 can scan the operating elements 41, 42, 43, 44 and 45 and identify them without looking. This type of identifiability is particularly suitable for a vehicle.

Figure 8:
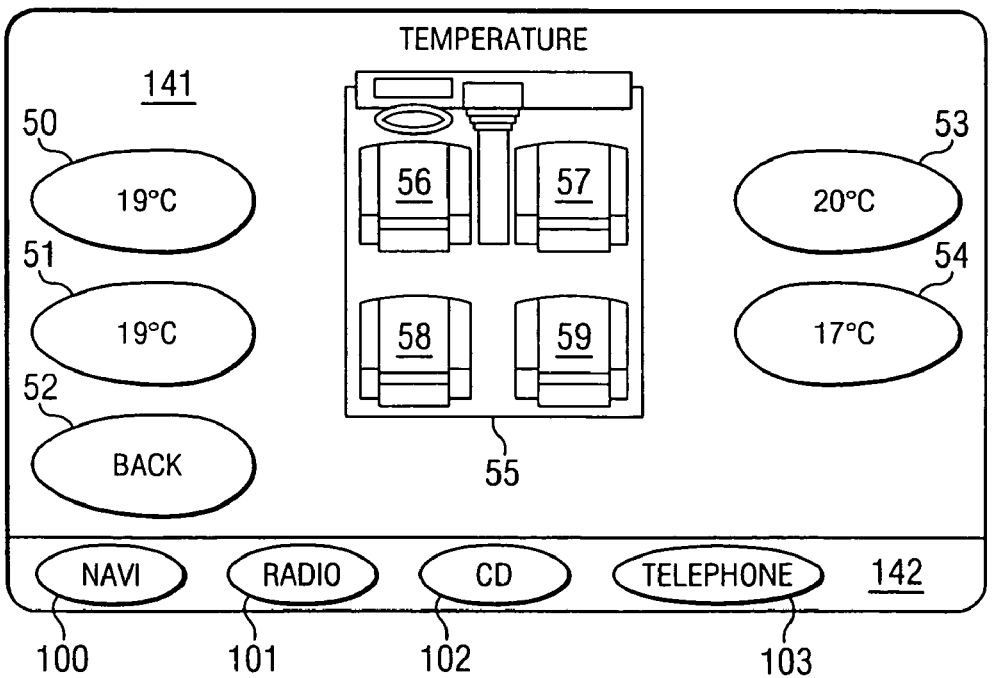
FIG. 8 shows a practical example for a mask for operation of an air conditioner.

By pressing the operating element 45 in FIG. 7, a mask, depicted in FIG. 8 for operation of an air conditioner, is called up. Temperature information of the individual locations in the vehicle interior, together with operating elements 50, 51, 52, 53 and 54, are shown in the mask depicted in FIG. 8, in which the temperature information also refers to actually set temperatures that can be changed via operating elements 50, 51, 53 and 54.

The display according to FIG. 8, with the heading "TEMPERATURE" and the display of internal space 5 of a vehicle makes it clear that the temperature in the vehicle interior can be adjusted individually and in relation to seat location. The operating element 50 shows, for the front vehicle driver seat 56, that a temperature of 19° C. is set. The operating element 53 shows, for the front passenger seat 57, that a temperature of 20° C. is set. For the back seats 58 and 59, 19° C. is set on the left side and 17° C. on the right. The operating element 52 has an allocation, i.e., a function allocation, that is shown in the display field with "back" (to the next higher menu display, i.e., in the present case, to the mask according to FIG. 7).

If the input device 40, on its touch surface, in a region 141 outside of the operating elements 50, 51, 52, 53 and 54 or in a region 142 outside the operating elements designated with reference numbers 100, 101, 102 and 103, is touched, a control signal S is generated by control 20 to simulate a rough surface of the touch surface. Surface properties, different for regions 141 and 142, are then simulated. It can be prescribed, during touching of operating elements 50, 51, 52, 53, 54, 100, 101, 102 and 103, that no special surface properties are simulated or surface properties different than those for regions 141 and 142 are simulated.

Figure 9:
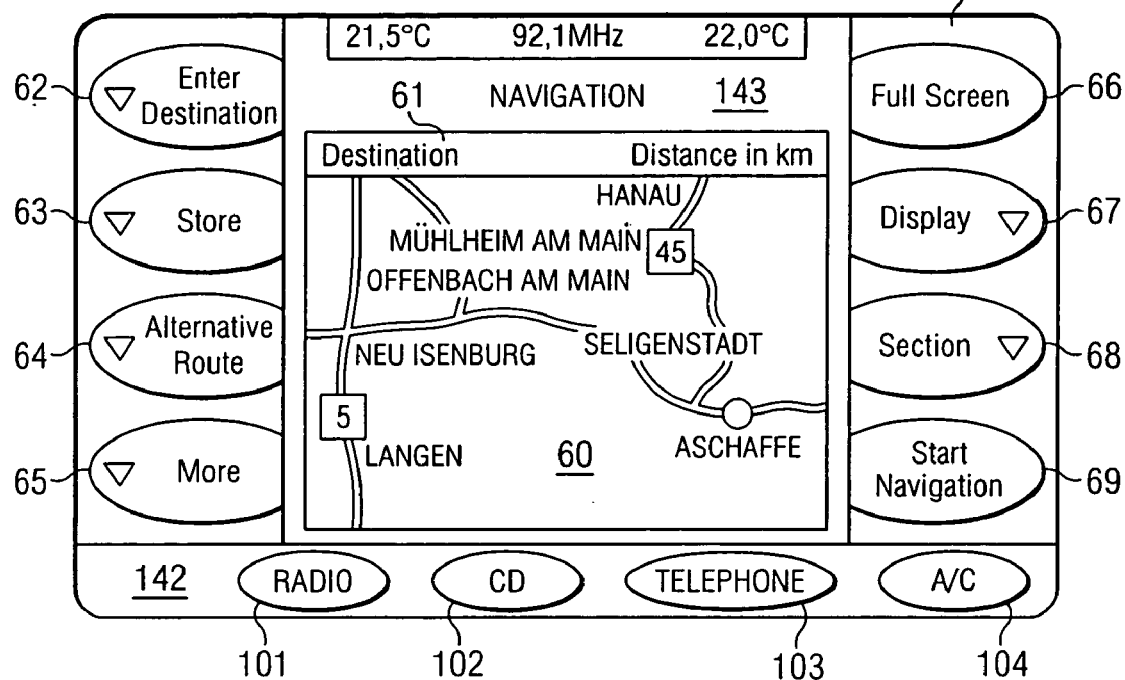
FIG. 9 shows a practical example for a mask for operation of a navigation system.

By pressing the operating element 41 in FIG. 7, a mask, depicted in FIG. 9, is called up for operation of a navigation system. The mask shows a section of a street map 60 of the instantaneous vehicle location, as well as above the street map 60, in a field 61, the destination and distance to the destination. In addition, operating elements 62, 63, 64, 65, 67 and 68 are shown, by means of which submasks can be called up by pressing. An operating element 66, to display a full image, and an operating element 69, to start a guiding, is also shown. With reference to the details of the menu, WO 00/21795 is referred to, in which the operating element 62, 63, 64, 65, 66, 67, 68 and 69 replace the operating elements 3a, 3b, 3c, 3d, 3e, 3f, 3g and 3h, disclosed in WO 00/21795.

If the input device 40 is touched on its touch surface in a region 143 or 144 outside of the operating elements 62 63, 64, 65, 66, 67, 68 and 69, or in a region 142 outside the operating elements designated with reference numbers 101, 102, 103 and 104, control signal S is generated by the control 20 to simulate a rough surface of the touch surface. Different surface properties are then simulated for regions 143, 144 and 142. It can be prescribed, during touching of operating elements 62, 63, 63, 64, 65, 66, 67, 68, 69, 101, 102, 103 and 104, that no special surface properties are simulated, or surface properties different than those for regions 143, 144 and 142 are simulated.

Figure 10:
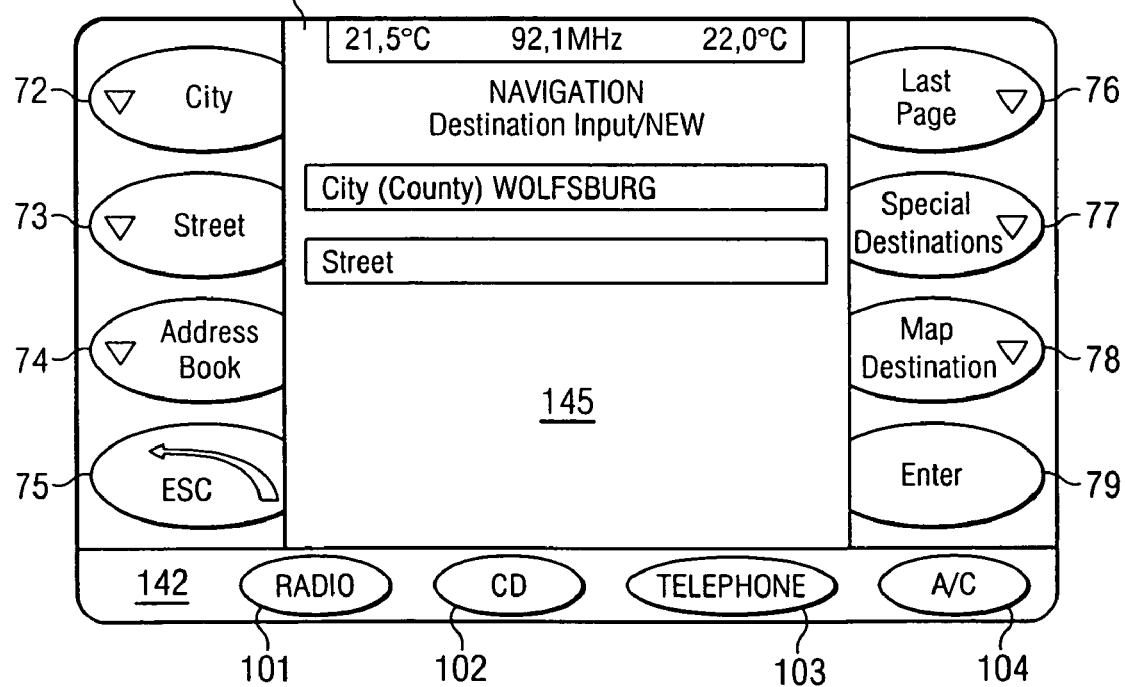
FIG. 10 shows a practical example for a submask for operation of a navigation system.

By pressing the operating element 62 in FIG. 9, a submask according to FIG. 10 is called up, which shows the travel destination in a field 70. By means of the submask according to FIG. 10, operating elements 72, 73, 74, 75, 76, 77, 78 and 79 are also shown. With reference to details of the menu, WO 00/21795 is also referred to, in which the operating elements 72, 73, 74, 75, 76, 77, 78 and 79 shown on the display are replaced with the operating elements 3a, 3b, 3c, 3d, 3e, 3f, 3g and 3h, disclosed in WO 00/21795.

If the input device 40 is touched on its touch surface in the region 145 outside of operating elements 72, 73, 74, 75, 76, 77, 78 and 79 or in region 142 outside of the operating elements 101, 102, 103 and 104, a control signal S is generated by control 20 to simulate a rough surface of the touch surface. Different surface properties are then simulated for regions 145 and 142. It can be prescribed, during touching of operating elements 72, 73, 74, 75, 76, 77, 78, 79, 101, 102, 103 and 104, to simulate no special surface properties or surface properties different than those for regions 145 and 142.

Figure 11:
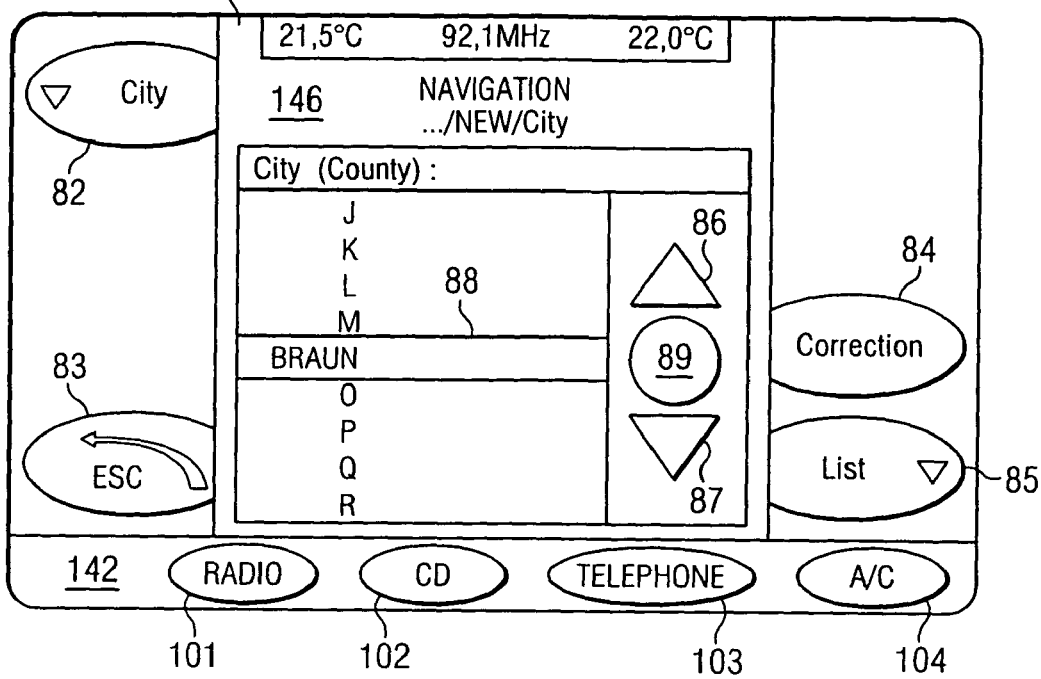
FIG. 11 shows a practical example for an other submask for operation of a navigation system.

By pressing the operating elements 72 in FIG. 10, a submask according to FIG. 11 is called up, which shows a destination to be entered in a field 80. By means of the submask according to FIG. 11, operating elements 82, 83, 84 and 85 are also shown, which replace the operating elements 3a, 3d, 3g and 3h, disclosed in WO 00/21795. A letter selection line 88, as well as operating elements 86, 87 and 89, are shown in field 80. The letter selection line 88 can be moved upward or downward by pressing operating elements 86 and 87. By pressing operating element 89, a marked letter can be chosen.

If the input device 40 is touched on its touch surface in the region 146 outside of operating elements 82, 83, 84, 85, 86, 87 and 89 or in region 142 outside of the operating elements 101, 102, 103 and 104, a control signal S is generated by control 20 to simulate a rough surface of the touch surface. For regions 146 and 142, different surface properties are then simulated. It can be prescribed, during touching of operating elements 82, 83, 84, 85, 86, 87, 88, 89, 101, 102, 103 and 104, then no special surface properties are simulated or surface properties different from those for regions 146 and 142 are simulated.

Figure 12:
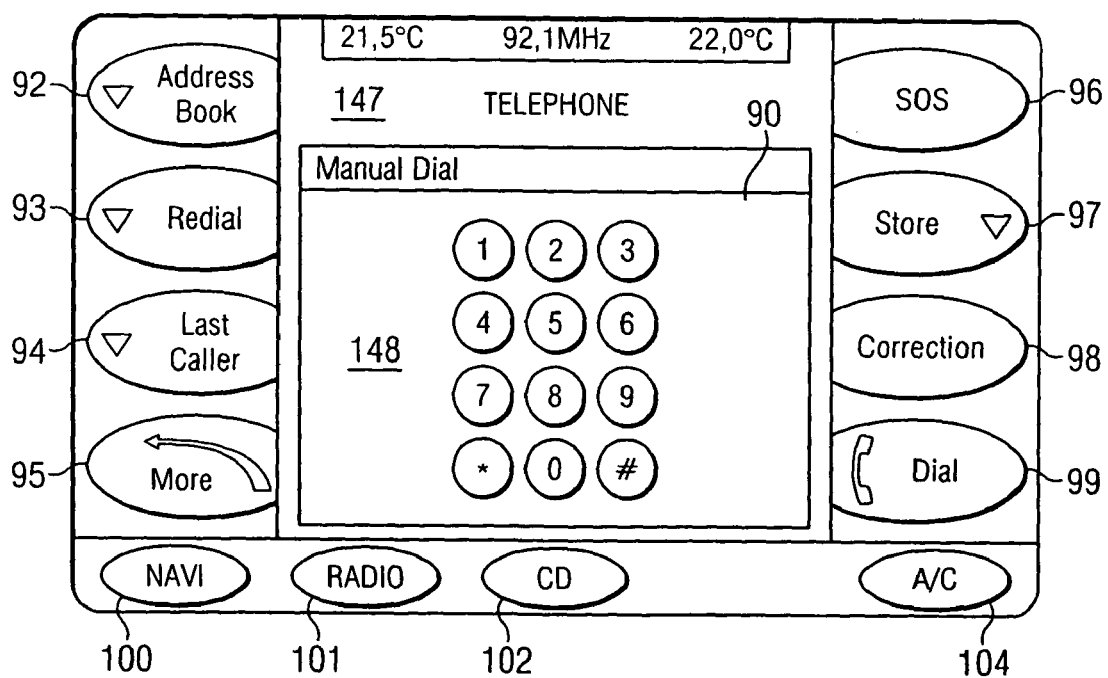
FIG. 12 shows a practical example for a mask for operation of a telephone.

By pressing operating element 44 in FIG. 7, a mask shown in FIG. 12 for operation of a telephone is called up, which shows selection keys for a telephone in field 90. By means of the submask according to FIG. 12, operating elements 92, 93, 94, 95, 96, 97, 98 and 99 are also shown, which replace the operating elements 3a, 3b, 3c, 3d, 3e, 3f, 3g and 3h, disclosed in WO 00/21795. The selection keys shown in field 90 for a telephone are designed as operating elements, by means of which a telephone number can be dialed.

If the input device 40 is touched on its touch surface in region 147 and 148 outside of operating elements 92, 93, 94, 95, 96, 97, 98 and 99 and selection keys are touched in a region 142 outside of operating elements 101, 102, 103 and 104, a control signal S is generated by the control 20 to simulate a rough surface of the touch surface. Different surface properties are then simulated for regions 146 and 142. It can be prescribed, on touching of operating elements 92, 93, 94, 95, 96, 97, 98, 99, 101, 102, 103 and 104 and selection keys, that no special surface properties are simulated, or surface properties different from those for regions 147, 148 and 142 are simulated.

The operating elements 100, 101, 102, 103 and 104, shown in the masks and submasks according to FIG. 8, FIG. 9, FIG. 10, FIG. 11 and FIG. 12, correspond to the operating elements 41, 42, 43, 44 and 45.

It can be prescribed that during pressing of operating elements 41, 42, 43, 44, 45, 50, 51, 52, 53, 43, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 and 104, a haptic feedback is produced. For this purpose, the touchscreen of display 40 is then moved when a user input has occurred by pressing the corresponding operating element 41, 42, 43, 44, 45, 50, 51, 52, 53, 43, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 and 104. This is particularly advantageous for use in a vehicle, since a user, i.e., the driver of a vehicle, in this way receives confirmation of his input without having to look at the display. In this way, safety during driving is increased.

The invention is particularly suitable for use in a vehicle, but not restricted to this use. A vehicle according to the invention is especially a land vehicle, usable individually in traffic. Vehicles according to the invention are not restricted to land vehicles with internal combustion engines.

LIST OF REFERENCE NUMBERS 1, 5 Cockpit
2, 6 Steering wheel
3, 7 Dashboard
4, 8, 10, 40 Input device
11, 12, 13, 14 Spring
15 Frame
15A, 15B, 15C, 15D Connection element
16 Touchscreen
16A Operating surface
17 Display
18 Actuator
18A Drive shaft pin
19 Connection piece
20 Distortion control
21 Reference element
25, 27 Spring arm
26 Connection point
28 Opening
29A, 29B, 29C, 29D Mount
30, 31 Speed calculator
32 Module for calculation of a total speed
33 Control module
35 Kalman filter
36 Function block
41, 42, 43, 44, 45,
50, 51, 52, 53, 54,
62, 63, 64, 65, 66,
67, 68, 69, 72, 73,
74, 75, 76, 77, 78,
79, 82, 83, 84, 85,
86, 87, 89, 92, 93,
94, 95, 96, 97, 98,
99, 100, 101, 102,
103, 104 Operating elements
55 Internal space
56 Vehicle driver seat
57 Passenger seat
58, 59 Back seat
60 Street map
61, 70, 80, 90 Field
88 Letter selection line
140, 141, 142,
143, 144, 145,
146, 147, 148 Region
AZ, P Signal
D Thickness
HR Main direction
NR Secondary direction
M Deflection
S Control signal
$\hat{v}$ Total speed
$\hat{v}_x$ Speed of a touching movement over an operating surface in the x direction
$\hat{v}_y$ Speed of a touching movement over an operating surface in the y direction
x x component of a position
$\hat{x}$ Estimated x component of a position
y y component of a position
$\hat{y}$ Estimated y component of a position

What is claimed is:

1. An input device comprising:
    a touchscreen for entry of commands by touching an operating surface of the touchscreen or by pressing on the operating surface;
    at least one essentially U-shaped spring mechanical connecting the touchscreen to a reference structure;
    wherein the operating surface of the touchscreen and at least one essentially U-shaped spring extend generally in the same plane;
    an actuator actuated by a control signal to cause physical movement of the touchscreen in at least one direction, wherein a frequency of the physical movement of the touchscreen is at least partially defined by the U-shaped springs; and
    a control module to generate the control signal to control the actuator to cause physical movement of the touchscreen as a function of a speed of a touching movement over the operating surface or a quantity derived from this speed.

2. An input device according to claim 1, further comprising:
    a speed calculator to determine the speed of the touching movement over the operating surface or a quantity derived from this speed.

3. An input device according to claim 2, wherein the speed of the touching movement over the operating surface or a quantity derived from this speed can be determined as a function of a position of touching of the operating surface.

4. An input device according to claim 2, wherein the speed calculator includes a Kalman filter.

5. An input device according to claim 1, wherein the actuator can be driven by the control module as a function of the position of touching of the operating surface or the position of pressing on the operating surface.

6. An input device according to claim 1, wherein the touchscreen can be moved by the actuator periodically with a frequency or amplitude adjustable by means of the control module.

7. An input device according to claim 6, wherein the frequency or amplitude can be adjusted as a function of the speed of the touching movement over the operating surface or a quantity derived from this speed.

8. An input device according to claim 1, wherein the touchscreen can be moved by the actuator essentially parallel to the operating surface.

9. An input device according to claim 1, wherein a rotational movement can be generated by the actuator.

10. An input device according to claim 9, wherein the axis of the rotation of movement is essentially perpendicular to the operating surface.

11. An input device according to claim 1, wherein the essentially U-shaped spring has a spring constant adjusted to a weight of the touchscreen, no that the touchscreen, in conjunction with the essentially U-shaped spring, has a mechanical natural frequency from 5 Hz to 150 Hz.

12. An input device according to claim 11, wherein the actuator is driven,
so that during touching of the operating surface on a first position, a supposedly surface condition of the operating surface can be felt, which can be distinguished from the actual surface condition of the operating surface, or
that during touching of the operating surface on a first position, a supposedly surface condition of the operating surface can be felt that can be distinguished from a supposedly surface condition of the operating surface at least one second position.

13. An input device according to claim 1, wherein each essentially U-shaped spring is generally aligned in the same plane as the touchscreen.

14. An input device according to claim 1, wherein:
the touchscreen lies in a plane;
the at least one essentially U-shaped spring allows for physical movement of the touchscreen in (a) a first direction generally within the plane of the touchscreen and (b) a second direction generally within the plane of the touchscreen and perpendicular to the first direction.

15. An input device according to claim 1, wherein:
the touchscreen lies in a plane;
each essentially U-shaped spring has (a) a first spring constant in a first direction generally within the plane of the touchscreen and (b) a second spring constant in a second direction generally within the plane of the touchscreen and perpendicular to the first direction, the second spring constant being different from the first spring constant.

16. An input device comprising:
a touchscreen for input of commands by touching an operating surface of the touchscreen or by pressing on the operating surface;
at least one essentially U-shaped spring mechanical connecting the touchscreen to a reference structure;
wherein the operating surface of the touchscreen and at least one essentially U-shaped spring extend generally in the same plane;
an actuator actuated by a control signal to cause physical movement of the touchscreen in at least one direction, wherein a frequency of the physical movement of the touchscreen is at least partially defined by the U-shaped springs; and
a control module to generate the control signal to control the actuator to cause physical movement of the touchscreen such that:
a first supposed surface condition of the operating surface can be felt by one touching the operating surface on a first position; and
a second supposed surface condition of the operating surface different than the first supposed surface condition can be felt by one touching the operating surface on a second position distinct from the first position;
wherein the first and second supposed surface conditions differ from an actual surface condition of the operating surface.

17. An input device comprising:
a touchscreen for entry of a command by touching an operating surface of the touchscreen or by pressing on the operating surface;
at least one essentially U-shaped spring mechanical connecting the touchscreen to a reference structure;
wherein the operating surface of the touchscreen and at least one essentially U-shaped spring extend generally in the same plane;
an actuator actuated by a control signal to cause physical movement of the touchscreen in at least one direction, wherein a frequency of the physical movement of the touchscreen is at least partially defined by the U-shaped springs; and
an observer to determine a speed of a touching movement over the operating surface or a quantity derived from the speed, wherein the control signal causes physical movement of the touchscreen as a function of the speed or the quantity derived from the speed.

18. An input device according to claim 17, wherein the observer is configured as a Kalman filter.

* * * * *